Aug. 28, 1951
C. M. CAMBERN
2,565,948
METHOD OF MANUFACTURING SCREW DRIVERS
Filed Aug. 6, 1946
2 Sheets-Sheet 1
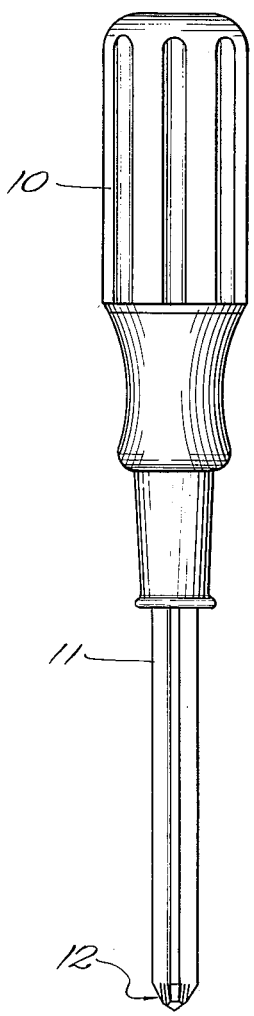
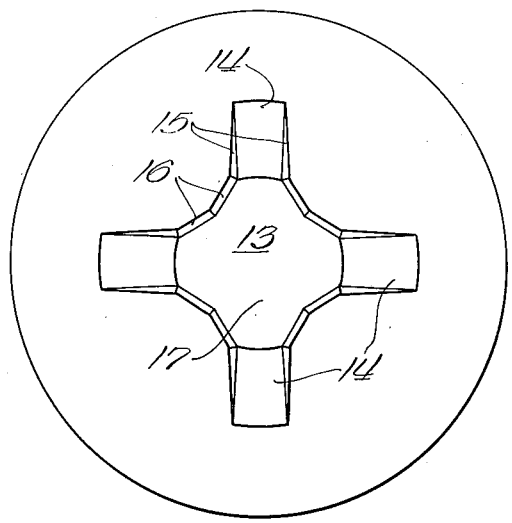
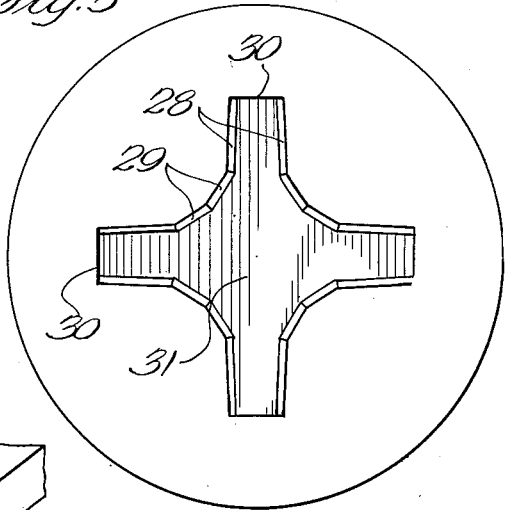
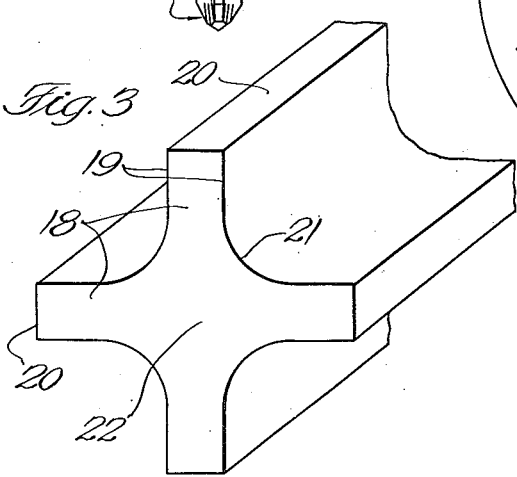
INVENTOR
Cecil M. Cambern
BY
ATTORNEY Aug. 28, 1951        C. M. CAMBERN        2,565,948

METHOD OF MANUFACTURING SCREW DRIVERS

Filed Aug. 6, 1946        2 Sheets-Sheet 2

INVENTOR
Cecil M. Cambern
BY E. A. Buchanan
ATTORNEY

Patented Aug. 28, 1951

2,565,948

UNITED STATES PATENT OFFICE 2,565,948

METHOD OF MANUFACTURING SCREW DRIVERS

Cecil M. Cambern, Portland, Oreg., assignor to Phillips Screw Company, a corporation of Delaware Application August 6, 1946, Serial No. 688,652

6 Claims. (Cl. 76—101)

The present invention relates to methods for manufacturing screw drivers and bits particularly adaptable for use in driving screws and the like fastening devices provided with a driver engaging recess in the head thereof.

A general object of the present invention is to provide new and improved methods for manufacturing drivers or bits for recessed head screws and the like fastening devices and having recess engaging portions formed more accurately than by production methods heretofore employed.

A further object is to provide methods for manufacturing drivers and bits for recessed head screws having improved wearing qualities.

Another object is to provide new and improved methods for manufacturing drivers and bits of the class described and at lower cost than comparable products now being used.

A still further object of the present invention is to provide a new and improved method for manufacturing screw drivers and bits of the type shown, for example, in the patent to Phillips et al., 2,046,840.

And another object of the present invention is to provide a new and improved method of manufacturing screw drivers and bits of the type referred to above with a greater degree of uniformity and accuracy and also at a greatly reduced cost.

In accordance with the present invention drivers and bits are made from rod stock first rough shaped to a cross sectional configuration corresponding to the plan shape of the screw recess. Tapered surfaces are then formed on the opposite side walls of the vanes by means of a die, after which desired lengths are severed from the supply rod and which are then further machined to form the outer end wall surfaces of the driver bit.

Further objects and advantages of the invention will appear from the following description taken in connection with the accompanying drawings while the features of novelty will be pointed out with greater particularity in the appended claims.

Figure 4:
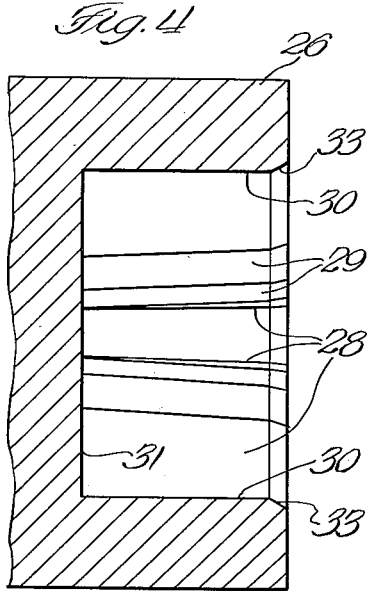
Figure 6:
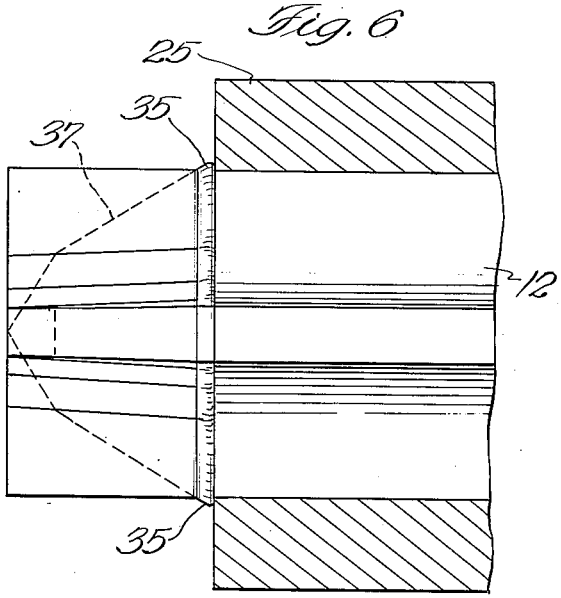
Figure 7:
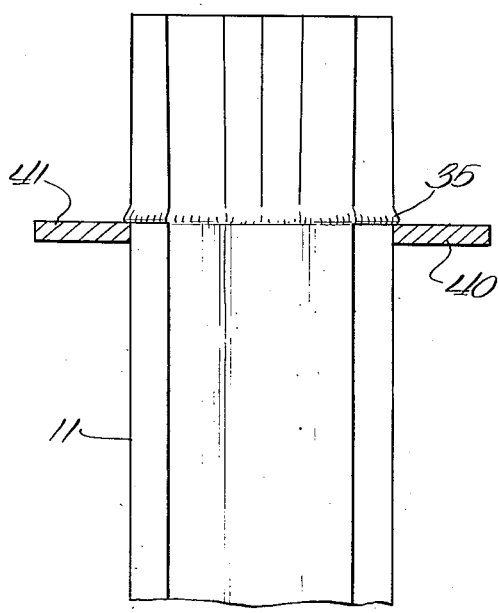
Figure 8:
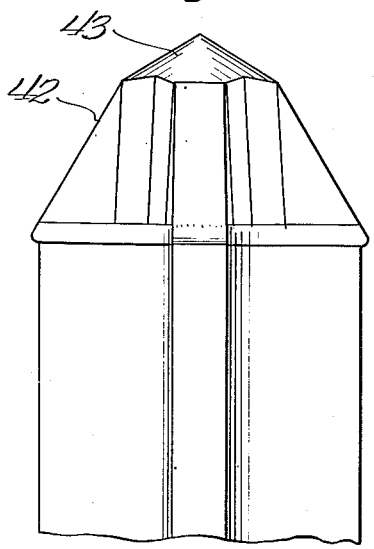

Referring to the drawings, Fig. 1 is an elevation of a screw driver constructed in accordance with one form of the present invention; Fig. 2 is a plan view illustrating a typical screw head recess; Fig. 3 is a fragmentary view in perspective illustrating a section of a rod formed for use in screw drivers of the present invention; Fig. 4 is a cross sectional view of a forming die used in one step of the manufacture of drivers of the present invention; Fig. 5 is a plan view of the forming die shown in Fig. 4; Fig. 6 is a side elevation, partly in section, illustrating a partially formed driver bit; Fig. 7 is a diagrammatic view illustrating a method for handling partially formed bits; and Fig. 8 is a side elevation illustrating the completed bit portion of the end of a driver.

Recessed head screws have been widely adopted by manufacturing industries and other consumers because of certain inherent advantages realized from the usage thereof, such as, ability to transmit increased driving torque, freedom from slippage of the driver from the screw head, and adherence of the screw onto the end of the driver to permit insertion of the screw into relatively inaccessible locations.

One typical form of recessed head screws is shown in the Phillips et al. Patent 2,046,839 and while the present invention will be described with particular reference to a driver for use in connection with screws having heads recessed as shown in that patent it is to be understood that the present invention is not to be limited to that particular form since it will readily be understood by those skilled in the art that the driver and method of manufacture herein described may equally well be adapted to drivers for use with other types of recesses.

The recesses disclosed in the above mentioned Phillips patent may generally be defined as being of cruciform plan the opposite sides of the wings of the recess comprising a plurality of flat tapered angularly disposed plane faces, the outer end walls of the recess wings being further inclined inwardly toward the axis of the recess. The recesses are formed in the screw head by a cold forging process in an automatic heading machine and for this reason can be readily produced at relatively low cost.

Drivers now in common usage in connection with screws of the type disclosed in the above mentioned patent are more particularly described in the Phillips et al. Patent 2,046,840. The faces of the driver bit are shaped so as cooperatively to fit snugly into the screw recess in order that the screw will be held by frictional resistance between the adjacent surfaces onto the end of the bit throughout movement thereof in any direction. Square engagement between all of the adjacent faces of the driver bit and the screw recess is important in order that the driving force be distributed over the maximum possible area of contact whereby the life of the driver is prolonged to the maximum possible extent.

Because of the angle of the slope of the side walls of the recess it is necessary to provide an identical angle of taper on the various faces of the driver bit for reasons as above stated. Screw drivers and bits for this type of screw recess are now commonly manufactured from solid steel rod by a plurality of machining operations and which inherently results in a high unit cost. Since the accuracy of the finished product depends upon the ease in which the machine is set and maintained in operating condition, continuous supervision of the operation of the machine and careful checking and inspection of the product is required. As distinguished from the prior practice, screw drivers and bits of the present invention are made from a continuous or long length of blank rod stock manufactured with a cross sectional configuration corresponding substantially to the cross sectional configuration of the screw head recess. The opposite side walls of the vanes at one end of the rod, which are usually formed with a milling cutter, are formed in accordance with the present invention by means of a die of the impact type. The tapered angular faces defining the grooves between each pair of adjacent vanes are thus quickly and accurately formed and at the same time the metal of the bit end is compressed or work hardened by the forging action of the die. Short lengths with the partially formed bit end are then severed from the supply rod and which are then finished in a lathe or other suitable machine by cutting away, or shaving, the outer end edge portions to provide the required frusto-conical contour to the bit end. The bits are then suitably heat treated for further hardening and then mounted in handles or adapters.

Referring now to the drawings, in Fig. 1 is shown a side elevation of a screw driver constructed in accordance with the present invention and comprising a handle 10 and a tool element 11 mounted therein the tool element having a screw recess engaging bit portion 12 on the lower end thereof particularly adapted for use in driving screws of the type shown in the Phillips et al. Patent 2,046,839 and further illustrated in Fig. 2.

In Fig. 2 is shown an enlarged plan view of a head of a screw or other fastening device provided with a generally conical recess 13 comprising a plurality of radially extending slots defined by the outer end walls 14 which are inclined inwardly toward the axis of the recess at the bottom thereof and by opposite side walls 15, the opposite side walls of each pair of adjacent slots merging with a pair of intermediate angular contiguous wall portions 16. The opposite side walls 15 diverge from each other from their outermost portions in the direction inwardly toward the axis of the recess and also taper inwardly towards each other where they meet with the outer wall 14 toward the bottom of the recess. The intermediate wall portions 16 also taper inwardly toward the axis of the recess at the lower end thereof. The bottom 17 of the recess is bluntly concave.

Referring now to Fig. 3, a section of blank rod or bar stock is illustrated formed for use in making drivers according to the present invention. The rod or bar comprises a plurality or radially extending vanes 18 which, in this instance are four in number and arranged at right angles with respect to each other. The vanes 18 are defined by the opposite side walls 19 and an outer wall 20 the side walls of each adjacent pair of vanes 18 merging with a concave bottom wall 21 extending therebetween. All of the walls 19, 20 and 21 extend parallel with the longitudinal axis of the rod or bar. It will be observed that the side walls 19 diverge from each other from the outer wall 20 and more particularly adjacent their innermost portions toward the axis of the rod whereby a relatively heavy core section 22 is provided for the tool element. This is of considerable importance in order that the driver tool will possess sufficient torsional rigidity to permit driving of screws without undue twisting of the shank portion. It is to be understood that the cross sectional shape of the rod or bar need be only a rough approximation of the cross sectional shape of the screw head recess adjacent its upper portion and considerable latitude is permissible. It is preferred, however, that the maximum diameter of the rod or bar correspond substantially to the maximum diameter of the screw head recess at the upper end thereof and that the thickness of the vanes 18 be substantially equal to the width of the slots between the side walls 15 of the screw head recess as indicated in Fig. 2. The blank rod or bar stock may be made in long continuous lengths either by cold rolling in a rolling mill with shaped rolls or by drawing through a suitable forming die. It may be desired to form the rod or bar roughly to shape by rolling and to draw it to the final desired dimension. The rod or bar thus formed may be supplied in long lengths to the screw driver manufacturer who may perform the remaining manufacturing steps.

Referring now to Figs. 4 to 6, the blank rod or bar is then introduced into a conventional form of cold heading machine equipped with an anvil block 25 provided with a passage therethrough of substantially the same configuration as that of the rod. The heading machine is also provided with an impact forming die comprising a block 26 having a cavity formed therein of generally cruciform plan shape, the configuration at the upper end of the cavity being substantially identical to the configuration of the screw recess of Fig. 2 at its upper end. The depth of the cavity is at least as great and preferably slightly greater than the depth of the screw recess. The side walls of the wings of the cavity are defined by a plurality of flat tapered surfaces corresponding accurately with the taper and spacing of the corresponding wall portions of the screw recess. These wall surfaces are more particularly identified as the side wall surfaces 28, the side walls of each two adjacent wings merging at angles with a pair of intermediate angularly disposed contiguous wall portions 29. All of the walls 28 and 29 slope inwardly toward the axis of the cavity at the bottom thereof. The outermost walls 30 of each of the cavity wings, however, extend parallel with the axis of the cavity while the bottom 31 of the cavity extends at right angles to the cavity axis. It will thus be noted that the cavity in the forming die differs as regards the outer and bottom walls, 30 and 31, from the screw recess shown in Fig. 2.

The end portion of the blank rod gripped firmly in the anvil block 25 of the heading machine and projecting a predetermined measured distance outwardly therefrom is then struck with the forming die and with sufficient pressure so that the metal of the rod end will flow so as completely to fill the die cavity whereby the opposite side walls of each of the vanes and the bottom walls between each pair of adjacent vanes are cold forged to the shape and angle of taper of the various faces 28 and 29 of the die as shown in Fig. 6. The outermost edge of the cavity within the forming die is preferably cut away at an angle as indicated at 33 to facilitate the entry of the rod end into the cavity and also to provide space into which excess material resulting from the forging of the tapered faces may flow. By reference to Fig. 6 it will be observed that a protuberant ridge 35 is formed extending around the rod at the end of the forged portion away from the tip thereof. This protuberant ridge or bead and particularly that portion which projects outwardly from the outer walls serves an important function which will be described hereinafter.

Upon completion of the forging operation as described the forming die is then withdrawn relatively from the end of the rod and the rod is then advanced through the anvil block 25 for a suitable distance depending upon the length desired for the bit or driver shank as the case may be, after which it is sheared off flush with the face of the anvil block and dropped into a suitable receptable from which it may be passed on for the remaining operations.

It will be observed that the forged bit end must now be trimmed or shaved to the dotted lines 37 to provide the tapered outer end wall surfaces requisite for fitting cooperatively into the screw recess of Fig. 2. This finishing operation is a relatively easy one to perform and may be done either by grinding or by cutting. Preferably it may be performed in an automatic screw machine and, in the case of short length bits, the partially formed elements may be dumped into a hopper of the screw machine and fed therefrom to the chuck. By virtue of the protuberant portions 35 projecting outwardly from the outer edge walls of the bits, shoulders are formed whereby they may be picked up with a conventional type of lifter fork, as illustrated in Fig. 7 in which the fork tines are indicated at 40 and 41.

In Fig. 8 is illustrated the completed bit formed by cutting away, or shaving the outer end portions of the vanes along the dotted lines shown in Fig. 6 to provide outer end walls 42 inclined inwardly toward the axis of the bit at the same angle as the tapered end walls 14 of the screw recess and a bluntly tapered extreme end 43 corresponding generally to the convex bottom of the screw recess. The extreme end 43 is cut back sufficiently so that it will not bottom in the screw recess before full engagement is had between the adjacent opposite side and end walls of the screw recess and driver bit. The bits thus formed may then be suitably heat treated and hardened and then mounted in handles or adapters.

Attention is directed to the fact that no milling step is required in the manufacture of the driver and hence the inaccuracies which have resulted heretofore from worn or defective cutters and from improper setting of the indexing mechanism are eliminated by the present invention. By forming simultaneously all of the angular tapered faces defining the side walls of the bit vanes a greater degree of accuracy of manufacture is obtained and also due to the forging effect of the forming die, the metal of the bit end is compressed or rendered more dense thus resulting in a driver bit having improved wearing qualities.

Having described the invention in what is considered to be a preferred embodiment thereof it is desired that it be understood that the specific details shown are merely illustrative and that the invention may be carried out by other means.

What I claim is:

1. The method of forming tools for driving screws and the like fastener devices having a head recess of cruciform cross sectional configuration, the side walls of the recess wings being defined by a plurality of inwardly tapering flat faces, the outer walls of said wings being tapered downwardly and inwardly toward the axis of said recess, said method comprising the steps of forming a blank metal rod into a cruciform cross-sectional configuration conforming generally to the cross section of the screw recess including the forming of a plurality of radially extending vanes with opposite side and edge walls thereof extending longitudinally parallel with the axis of said rod, squaring the end of said rod, cold forging the squared end portion of said rod by forcing the same relatively into a forming die to change by pressure the shapes of the surfaces of said side walls of said rod end portion while leaving the outer end square, forming protuberances on the outer edge portions of said vanes adjacent the end of said cold forged portion away from the end of said rod, severing a length of said rod including said cold forged end portion from the remainder of said rod, and cutting away the corner portions of said vanes of said forged end portion to form inclined outer surfaces thereon tapering inwardly toward the axis of said rod length.

2. The method of forming tools for driving screws and the like fastener devices having a head recess of polygonal cross-sectional configuration, the side walls of the recess wings being defined by a plurality of flat tapered faces, the outer end walls of said wings being tapered downwardly and inwardly toward the axis of the recess, said method comprising the steps of forming a blank metal rod having a polygonal cross sectional configuration conforming generally to the cross section of the screw recess adjacent the upper end thereof and including the forming of a plurality of radially extending vanes having opposite side and outer edge walls extending longitudinally parallel with the axis of said rod, squaring the end of said rod, cold forging the squared end portion of said rod by forcing the same relatively into a forming die to form by pressure flat, tapered surfaces on the opposite side walls of said vanes corresponding to the recess side walls while leaving the outer end square, forming protuberant portions on the outer edges of said vanes adjacent the end of said cold forged portion remote from the end of said rod, severing a length from said rod greater than the length of said cold forged end portion and cutting away the corner portions of said vanes of said cold forged end of said rod length to form inclined surfaces thereon tapering inwardly toward the axis of said rod length corresponding to the angle of taper of the outer end walls of the recess wings.

3. The method of making a driver for screws and the like fastening devices having a recess in the head thereof, the side walls of said recess being tapered inwardly toward each other at the bottom of said slot, said method comprising the steps of forming a blank metal rod with a uniform cross-sectional dimension corresponding substantially to the cross-sectional dimension of said recess adjacent the upper end thereof, including forming the opposite side walls of said rod longitudinally parallel with the longitudinal axis of said rod throughout the full length thereof, forcing an end portion of said rod into a forming die with sufficient pressure to form tapered opposite side walls on said rod end portion adapted to fit snugly between the opposite side walls of said recess, and simultaneously forming protuberances on the side wall portions of said rod for facilitating forking up of said rod with said end portion extending in a predetermined direction.

4. The method of forming tools for driving screws and the like fastener devices having a head recess of cruciform cross-sectional configuration, the side walls of the recess wings diverging inwardly toward the axis of the recess and the outer end walls of the recess wings being inclined downwardly and inwardly toward the recess axis, said method comprising the steps of forming a length of blank metal rod having a generally cruciform cross-section configuration conforming generally to the cross section of the screw recess adjacent the upper end thereof and including forming a plurality of radially extending vanes having opposite side and edge walls extending parallel with the axis of the rod throughout the full length thereof, squaring an end of said rod, forcing the squared end of said rod into a forming die with sufficient pressure whereby the opposite side walls only of said vanes are reformed and provided with diverging surfaces corresponding to said diverging surfaces of the screw recess, and subsequently cutting away the corner portions of said vanes of said rod end to form outer inclined surfaces tapering inwardly toward the axis of said rod.

5. The method of forming tools for driving screws and the like fastener devices having a head recess of cruciform, cross-sectional configuration, the side walls of the recess wings being defined by a plurality of angularly disposed flat tapered faces, the outer end walls of said wings being tapered downwardly and inwardly toward the recess axis, said method comprising the steps of forming a length of blank metal rod having a cruciform cross-sectional configuration conforming generally to the cross section of the screw recess adjacent the upper end thereof, said forming step including the formation of a plurality of radially extending vanes having opposite side and edge walls formed longitudinally parallel with the rod axis, squaring the end of said rod, forcing the squared rod end relatively into a forming die with sufficient pressure to form a plurality of angularly disposed flat, tapered surfaces on the opposite side walls of said vanes corresponding to the recess side walls while leaving the outer end of said rod squared, and cutting away outer portions of said rod end to form inclined outer surfaces thereon tapered inwardly toward the rod axis.

6. The method of forming tools for driving screws and the like fastener devices having a head recess of cruciform cross-sectional configuration, the side walls of the recess wings being defined by a plurality of angularly disposed flat tapered faces, the outer walls of said recess wings being tapered inwardly and downwardly toward the recess axis, said method comprising the steps of forming a blank metal rod with a cruciform cross-sectional configuration conforming generally to the recess cross section adjacent the upper end thereof, said forming step including the formation of a plurality of radially extending vanes on said rod with opposite side and edge walls formed longitudinally parallel with the rod axis, squaring an end of said rod, forcing the squared end of said rod relatively into a forming die with sufficient pressure to change the shape of the opposite side walls only of said vanes of said end portion to a plurality of angularly disposed flat faces tapering inwardly toward the rod axis, said rod end being left square by said die forming operation, and subsequently cutting away the corner portions of said vanes of said rod end to form inclined outer surfaces thereon tapering inwardly toward the rod axis.

CECIL M. CAMBERN.

REFERENCES CITED

The following references are of record in the file of this patent:

UNITED STATES PATENTS

| Number | Name | Date |
|---|---|---|
| 229,485 | Sweet | June 8, 1880 |
| 961,184 | Walker | June 14, 1910 |
| 1,491,230 | Gray | Apr. 22, 1924 |
| 2,046,840 | Phillips et al. | July 7, 1936 |
| 2,066,372 | Tomalis | Jan. 5, 1937 |
| 2,116,775 | Blackburn | May 10, 1938 |
| 2,159,842 | Cook | May 23, 1939 |
| 2,297,983 | Rea | Oct. 6, 1942 |
| 2,366,682 | West et al. | Jan. 2, 1945 |

FOREIGN PATENTS

| Number | Country | Date |
|---|---|---|
| 46,617 | France | Apr. 28, 1936 |